March 11, 1969  N. D. FRAILLY  3,431,809
EXTERNAL RETAINING RING
Filed April 8, 1968

INVENTOR
NICHOLAS D. FRAILLY

BY Teagno & Toddy
ATTORNEYS

United States Patent Office 3,431,809
Patented Mar. 11, 1969

3,431,809
EXTERNAL RETAINING RING
Nicholas D. Frailly, Massillon, Ohio, assignor to Eaton Yale & Towne, Inc., Cleveland, Ohio, a corporation of Ohio
Filed Apr. 8, 1968, Ser. No. 720,439
U.S. Cl. 85—8.8                    11 Claims
Int. Cl. B16b 21/06

ABSTRACT OF THE DISCLOSURE

A uniform section split retaining ring comprising an arcuate middle part that is substantially circular and arcuate end parts varying outwardly from the middle part circularity such that the ring deforms circularly when expanded to pass over a shaft to insert in a groove thereon. The end parts have slots proximate the ends within the radial width for receiving a manipulating tool.

This invention relates to improvements in external retaining rings and more particularly to improved uniform section split retaining rings for securing structures or parts such as bearing, gears, and the like, against axial displacement on a shaft.

One widely known circular retaining ring is formed with a substantially uniform section wherein both the radial width and axial thickness are uniform throughout its entire arcuate extent and having a peripheral surface formed of a radius which is approximately equal to the radius of the base of the seating groove in which the ring is designated to be inserted. A disadvantage in this type of construction is the ring seats against the bottom or base of the groove without exerting a sufficiently desired force thereagainst. Another inherent disadvantage of prior circular uniform section rings is that when the ends are expanded preparatory to inserting the ring in a complementary seating groove, the ring deforms ovally which results in difficulties in assembly. Likewise, this oval deformation of the uniform section creates very high stresses in the ring which are detrimental thereto.

Another widely known ring discloses a configuration having tapered end sections wherein the ring radial thickness decreases symmetrically from the center to the free end portions. Here, the ring will remain in a substantially circular configuration as the free end portions are expanded. This type of ring when released will provide a high thrust load upon the base wall of the seating groove. These tapered rings are stamped from sheet metal and as a result of this stamping action, varying radii are generally formed on the inner and outer edges of at least one surface of the ring. Thus, if these irregularly rounded edges are positioned against a lateral thrust receiving base of the seating groove, any dynamic thrust exerted on the ring is translated to these irregularly rounded corners in contact with the thrust receiving lateral wall portion of the seating groove and may result in a reduced amount of thrust capacity.

In addition, this type of retaining ring, because of the tapered construction, extends or protrudes an unequal radial distance outward from the seating groove and thus creates an artificial retaining shoulder having a non-uniform axial bearing surface.

An object of applicant's invention is to provide a new and improved retaining ring with a generally uniform section substantially throughout its entire arcuate extent and in which the arcuate end parts of the ring have lesser curvature about the geometric center of the ring than the curvature of the arcuate middle part.

A further object is to provide a new uniform section retaining ring in which the upper portion comprises two spaced apart curved end parts each of which has a radius of curvature which is larger than the radius of the lower remaining portion of the ring, whereby the ring deforms into a substantially circular configuration when the two spaced apart members are expanded preparatory to insertion of the ring in a seating groove of a shaft and wherein the expanded diameter of the ring is greater than the diameter of the shaft to prevent scoring of the shaft during assembly of the ring. When expanded, the diameter of the circle formed by the inner peripheral surface of applicant's retaining ring is larger than the receiving shaft diameter and upon release of the ring, when positioned in the seating groove, the ring will contract inwardly into intimate contact with the base of the seating groove and effect bearing contact thereagainst throughout a large portion of the circumferential extent of the ring.

Another object of the present invention is to provide a uniform section retaining ring wherein the two end parts forming the ring upper portion have the configuration of a spiral having a center coinciding with the geometric center of the ring.

A further object is to provide a new uniform section split retaining ring wherein the end parts are each formed with a greater radius of curvature than the remaining ring middle part and provided near the end parts are slots to facilitate gripping of the ring for placement and removal from a shaft thereof.

The uniform section ring of the present invention has numerous advantages over prior art rings, some of which are:

(1) There is no radially projecting structure to interfere with other assembly parts;
(2) Axial thrust loading is borne by a greater ring face surface and is distributed more evenly against the groove side wall; and
(3) Equal corner radii eliminate the need for particular orientation of the ring when assembling.

The present invention provides an improved retaining ring which possesses the combined advantages of both the tapered and the prior art uniform section rings as previously noted. More specifically, the present invention contemplates a new retaining ring having an inner peripheral surface that exerts a tight pressure fit against the base wall of a complementary seating groove throughout a large portion of its arcuate extent; and further provides a face of uniform radial width for contacting the side wall of the seating groove such that when the ring is operatively disposed within the seating groove, the ring will radially project a substantially constant desired distance out from the shaft groove, thus providing a uniform shoulder and/or a bearing surface along the substantially complete arcuate extent of the ring. Accordingly, the present invention contemplates having the geometric center of the retaining ring, when operatively disposed in the seating groove, substantially coinciding with the geometric center of the shaft so that the outer edge of the ring generally projects outwardly from the shaft a substantially equal distance throughout the ring length.

A better understanding of the invention will be afforded by the following detailed description considered in conjunction with the drawing in which.

Figure 1:
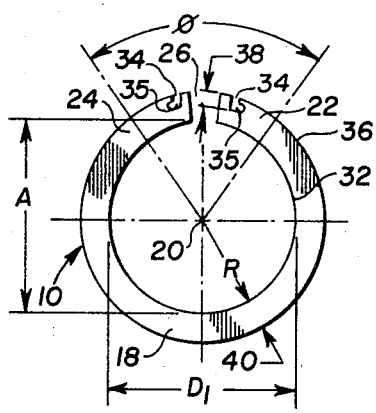
FIGURE 1 is a diagrammatic view illustrating one embodiment of the present invention in an unrestrained position.

Referring to FIGURES 1–5 of the drawing, more in detail wherein like numerals have been utilized to denote similar parts throughout the several views, there is disclosed in FIGURE 1 an external retaining ring 10 composed of a suitable elastic material, such as carbon steel, or some similar material of sufficient strength to provide an artificial shoulder for locating or preventing axial movement of a machine part, bearing, or other structure (not shown) on a shaft 12. The retaining ring 10 coacts with a seating groove 16 formed within the shaft 12 by contracting into gripping engagement with the groove base when placed thereon.

The ring 10 of FIGURE 1 has a lower portion or middle part 18 having a substantially circular configuration with a radius R which extends a predetermined arcuate distance about the geometric center 20. The upper portion of ring 10 is split into opposed end parts 22 and 24 in spaced relationship across gap 26. The curvature of end parts 22, 24, for example, within the arc of FIGURE 1, relative to geometric center 20, is less than the curvature of middle part 18 such that deflection of end parts 22 and 24 away from each other results in an elastic deformation of the inner peripheral surface 32 into a circle having an inner diameter $D_2$ which is greater than the shaft diameter $D_3$. Thus, the ring 10 may be easily passed over the shaft 12 to opposite groove 16 and released to clamp or grip the groove base which has an inside diameter $D_4$.

Figure 2:
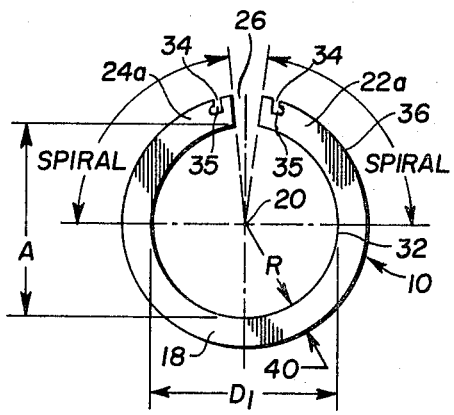
FIGURE 2 is a diagrammatic view of another embodiment of the present invention, in an unrestrained position.

It is possible to form the end parts 22, 24 with less curvature in various ways, such as: bending the end parts of a circular shaped ring away from the ring geometric center; forming end parts 22, 24 with a larger radius than $R_1$; and forming end parts 22, 24 with a spiral as shown in FIGURE 2. The important feature is, however, that in an unrestrained state, dimension A is greater than $D_1$ and the ring 10 overall, displays a free state non-circular configuration. Thus, when expanding the end portions 22 and 24 away from each other, the ring deforms circularly. When so expanded, the ring 10 is designed to be generally circular with a diameter larger than the diameter of the shaft over which the ring is to be passed.

Figure 3:
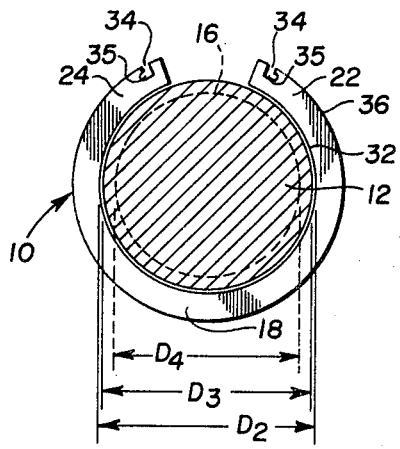
FIGURE 3 shows the ring of the present invention after it has been expanded for passing over the shaft to the seating groove.
Figure 5:
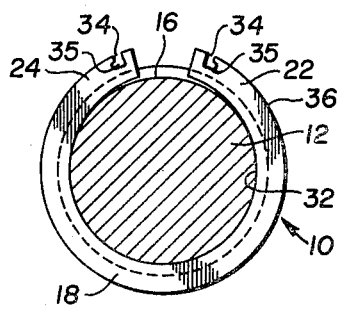
FIGURE 5 is a section taken along line 5—5 of FIGURE 4.
Figure 4:
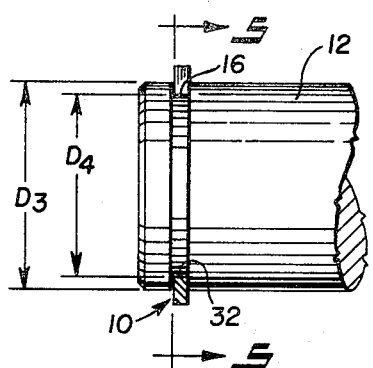
FIGURE 4 is a side view of shaft showing a cross section of the external ring operatively disposed within the seating groove.

The relative dimensions of the retaining ring 10, shaft diameter 12, and seating groove 16 are illustrated in FIGURES 1 and 3 in a general manner as follows:

$D_1$ is less than A;
$D_1$ is less than $D_4$;
$D_3$ is greater than $D_4$; and
$D_3$ is less than $D_2$.

The dimension reference characters are defined as follows:

$D_1$ is the smaller inside dimension of the ring 10 in a free or unrestrained state;
$D_2$ is the expanded inside diameter of the ring 10 which is obtained when members 22 and 24 are expanded apart;
$D_3$ is the diameter of the shaft 12;
$D_4$ is the inside diameter of the base of seating groove 16; and
A is the inside height of the ring measured from the center of ring middle part 18 to the tip of end portions 22 and 24.

Accordingly, as the two end parts 22 and 24 are forced apart, the ring 10 forms a circle having an inside diameter $D_2$ which is slightly larger than diameter $D_3$ of shaft 12. The stress created in the ring 10 by spreading the two end parts apart is of sufficient magnitude to just exceed the elastic limit of the ring material and a very slight permanent set is exhibited by the ring 10. However, the ring 10 is designed such that the inside dimension $D_1$ of the ring in a free or unrestrained state will spring back to a diameter less than the groove diameter $D_4$ after being expanded to pass over shaft 12. Accordingly, the ring upon being released will close into seating groove 16 and exert a radial force upon the base wall thereof.

By providing a ring 10 having an upper portion with a lesser curvature than the circular lower portion, end parts 22, 24 do not have to open as far as a ring of completely circular design to obtain clearance over a shaft for assembly and the amount of comparative ring deformation and accompanying permanent set is substantially reduced. As a result, the ring of this invention achieves the very important advantage of obtaining a greatly increased bearing surface along the inner periphery of the ring. Thus, by utilizing the ring configuration of the present invention, the desired characteristics of both the completely circular uniform section ring and the tapered ring are incorporated therein.

The slots 34 positioned on the outer side 36 of ring 10 are adapted to receive a manipulating tool (not shown) for spreading the members 22 and 24 apart for operatively positioning and removing ring 10 relative to shaft seating groove 16. Preferably, the slots 34 should have a dimension 38 that extends within the radial width 40 of the ring approximately one half the radial width 40 or ring 10, or of sufficient depth to prevent a tool, such as pliers, from slipping off. Further, it is preferred that slots 34 terminate in a widened portion at the inner end to form a cavity 35 to enhance retention of the ring by such plier tips. The cavity, of course, may be of any desired configuration such as circular, oval, rectangular or square.

Slots 34 play a significant part positioning and removing the ring 10 from groove 16. Previously, split rings were provided with small holes proximate their free ends adapted to receive the pointed noses of special pliers or similar tools for forcing the ends apart. However, in this instance when the ring is in place in its cooperating groove, the holes are partly or wholly within the groove and thus are difficult to locate and are inaccessible for gripping with ring removal tools. A general solution to this problem has been to provide outwardly projecting perforated ears or lugs at the ring ends to facilitate securement by special pointed-nose pliers. As may be observed, however, these ears protrude outward from the shaft thereby causing interference with mating parts and also, these rings present a non-uniform seating surface depth. The slots 34 or the present invention obviate the above problems by providing a slotted gripping aperture readily engageable by various manipulating pliers. To enhance this gripping, cavities 35 as discussed above are provided. It is apparent that in order for plier tips to become seated in the cavities 36 of external type rings, the cavities must be situated further from the ends of end parts 22, 24 than the slot openings in the ring outer periphery as the force of the plier tips in separating the ring ends is in this direction.

It will be observed in the drawings that opposed end parts 22, 24 define a gap 26 therebetween. The amount of gap generally is not critical and should be kept to a minimum in order to obtain the largest axial thrust bearing surface on the ring face as possible. Since the ring ends 22, 24 are expanded when emplacing external type rings, the gap spacing is not a required design consideration such as is found with internal type rings wherein the ring ends are brought together prior to emplacement of the ring.

FIGURE 2 shows another embodiment of the present invention wherein the end parts 22a and 24a forming the upper portion of ring 10 have the configuration of an outwardly directed spiral. The radius of the spiral for both end parts 22a and 24a emanates from the geometric center 20. The smallest radii of the spiral is generally equal to radius "R" and is located where end parts 22a and 24a are joined to the lower circular portion 18. From this juncture the radii of the spirals progressively increase. It is evident that here the end parts 22a, 24a of the ring in unrestrained condition flare outwardly, further away from the geometric center 20 than middle part 18. Thus, when the ends are forced apart, the ring deforms into the substantially circular configuration shown in FIGURE 3, with all of the attendant advantages of the invention as discussed above.

While the preferred embodiments of the invention have been described, it will be appreciated the invention is not limited thereto since it may otherwise be embodied.

What is claimed is:

1. A one-piece substantially planar split retaining ring for use in an external groove to control movement of a member within a housing, comprising:
    an arcuate middle part having a substantially uniform radius from a gometric center; and
    two end parts integral with said middle part and extending arcuately therefrom, said end parts having a greater radius from the middle part geometric center than the radius of said middle part, said end parts having apertures for engaging a manipulating tool for placing and removing said ring from a receiving surface on the member, and said ring having a substantially uniform section in radial width and axial thickness throughout said middle and end parts.

2. A split retaining ring as defined in claim 1 wherein said end parts spiral from said middle part and the internal radius of said end parts extending from the geometric center of said middle part progressively increases in the direction toward the ends of said end parts.

3. A split retaining ring as defined in claim 1 wherein said apertures are slots, the slots extending inwardly from the ring outer periphery and within the radial width of said uniform radial width section proximate the ends of said parts.

4. A split retaining ring as defined in claim 3 wherein said slots terminate in a widened portion at the inner end for enhancing retention of said ring to a manipulating tool.

5. A split retaining ring as defined in claim 3 wherein said slots extend completely through the axial thickness of said ring.

6. A split retaining ring as defined in claim 3 wherein said end parts spiral from said middle part with the internal radius of said end parts extending from the geometric center of said middle part progressively increasing in the direction toward the ends of said end parts.

7. A one-piece substantially planar split ring for use in an external groove to retain a first assembly member of an apparatus with a cooperating second assembly member, comprising
    an arcuate middle part having a substantially uniform radius of curvature from a geometric center; and
    two end parts integral with said middle part and extending arcuately therefrom, said end parts having a greater radius of curvature from said geometric center than said middle part, and said ring having a substantially uniform section in radial width and axial thickness throughout said middle and end parts.

8. A split retaining ring as defined in claim 7 wherein said end parts define apertures for engaging a manipulating tool for placing and removing said ring from a receiving surface on the assembly member.

9. A split retaining ring as defined in claim 8 wherein said apertures are slots, the slots extending from an open end in the ring outer periphery to a closed end within the radial width of said ring and the slots being proximate the ends of said end parts.

10. A split retaining ring as defined in claim 9 wherein each of said slots terminates in a cavity at the closed end for enhancing retention of said ring to a manipulating tool, each said cavity having a width transverse to the slot greater than the width of the associated slot opening in said ring outer periphery and each said cavity having a side further removed from said ring end than the furthermost side of said slot openings from said ring end.

11. A split retaining ring as defined in claim 9 wherein said end parts spiral from said middle part and the internal radius of said end parts extending from the geometric center of said middle part progressively increases in the direction toward the ends of said end parts.

References Cited

UNITED STATES PATENTS

| | | | |
|---|---|---|---|
| 1,066,339 | 7/1913 | Tegelbeckers et al. | 85—8.8 |
| 2,416,852 | 3/1947 | Schaaff et al. | 85—8.8 |
| 2,491,306 | 12/1949 | Feitl | 85—8.8 |
| 2,595,787 | 5/1952 | Heimann | 85—8.8 |

CARL W. TOMLIN, *Primary Examiner.*

R. S. BRITTS, *Assistant Examiner.*